(12) United States Patent
Schmitt et al.

(10) Patent No.: US 12,385,753 B2
(45) Date of Patent: Aug. 12, 2025

(54) CREATION OF FOLLOWING DISTANCE PROFILES

(71) Applicant: Robert Bosch GmbH, Stuttgart (DE)

(72) Inventors: Andreas Schmitt, Cologne (DE); Jesus Rodriguez, Yokohama (JP); Kazuya Tamura, Kanagawa (JP); Ming Gao, Harsum (DE); Oliver Roeth, Elze (DE); Keisuke Namura, Kanagawa (JP)

(73) Assignee: ROBERT BOSCH GMBH, Stuttgart (DE)

( * ) Notice: Subject to any disclaimer, the term of this patent is extended or adjusted under 35 U.S.C. 154(b) by 322 days.

(21) Appl. No.: 18/066,633

(22) Filed: Dec. 15, 2022

(65) Prior Publication Data
US 2023/0194287 A1   Jun. 22, 2023

(30) Foreign Application Priority Data
Dec. 21, 2021   (DE) ...................... 10 2021 214 759.3

(51) Int. Cl.
*G01C 21/34*   (2006.01)

(52) U.S. Cl.
CPC ................................ *G01C 21/3492* (2013.01)

(58) Field of Classification Search
CPC ........... B60W 30/165; B60W 60/0027; G01C 21/3407; G01C 21/3492; G01S 13/08; G01S 17/08; G08G 1/096725
See application file for complete search history.

(56) References Cited

U.S. PATENT DOCUMENTS

| 2010/0164753 A1* | 7/2010 | Free ................... G08G 1/09675 340/932 |
| 2017/0031361 A1* | 2/2017 | Olson ..................... G06V 20/56 |
| 2017/0350714 A1* | 12/2017 | Duan .................. G01C 21/3492 |
| 2018/0032080 A1* | 2/2018 | Oska ....................... G06V 20/58 |
| 2022/0379893 A1* | 12/2022 | Li .......................... G08G 1/167 |

FOREIGN PATENT DOCUMENTS

| DE | 102011083677 A1 | 4/2013 |
| DE | 102015215605 A1 | 2/2017 |
| DE | 102016113903 A1 | 3/2017 |
| EP | 2654027 A1 | 10/2013 |

* cited by examiner

*Primary Examiner* — Charles J Han
(74) *Attorney, Agent, or Firm* — NORTON ROSE FULBRIGHT US LLP

(57) ABSTRACT

A method for ascertaining following distances as a function of position by a control device. Measurement data of at least one trajectory along at least one route, having a multiplicity of measurement points including position data and distance data from vehicles that are ahead, are received, A group of test points along the route is distributed at pre-defined distances from one another. At each test point, an intersection line that is oriented transversely in relation to a course of the route is generated, Pairs of points corresponding to the intersection lines are ascertained from the multiplicity of measurement points. Based on the distance data, at least one following distance is allocated to the pairs of points corresponding to at least one intersection line. A control device, a computer program, and a machine-readable storage medium are also described.

9 Claims, 3 Drawing Sheets

CREATION OF FOLLOWING DISTANCE PROFILES

CROSS REFERENCE

The present application claims the benefit under 35 U.S.C. § 119 of German Patent Application No. DE 10 2021 214 759.3 filed on Dec. 21, 2021, which is expressly incorporated herein by reference in its entirety.

FIELD

The present invention relates to a method for ascertaining following distances as a function of position, a control device, a computer program and a machine-readable storage medium.

BACKGROUND INFORMATION

A trajectory is a sequence of time-stamped points that have been recorded in a particular coordinate system. In this context, the trajectory describes, for example, the route which is traveled by a vehicle and recorded by sequential geographical coordinates using a global navigation satellite system (GNSS). A topological map of traffic infrastructure comprises linked routes such as traffic lanes. A topological map of traffic infrastructure provides the basis for support for autonomous driving and automated assistance systems. A topological map of this kind may also be enriched by information from trajectory data in order to enhance its usefulness.

German Patent Application No. DE 10 2015 215 605 A1 describes a method for controlling at least one traffic control system of a road network, in which data from a vehicle, containing data of a location of the vehicle, are received, and in which the data are taken into account for controlling the traffic control system of the road network.

German Patent Application No. DE 10 2016 113 903 A1 describes a computer that is programmed to identify, from a first vehicle, one or more second vehicles within a specified distance of the first vehicle. Moreover, data are received regarding operations of each of the second vehicles, including journey data.

SUMMARY

An object of the present invention is to provide a method that broadens the scope of functions of topological maps and increases driving comfort in road traffic.

This object may achieved by the present invention. Advantageous embodiments of the present invention are disclosed herein.

According to one aspect of the present invention, a method is provided for ascertaining following distances as a function of position. The ascertained following distances may preferably be incorporated into a topological map for automated or partially automated driving. The method may be carried out for example by a control device.

According to an example embodiment of the present invention, in one step, measurement data of at least one trajectory, having a multiplicity of measurement points, are received. The trajectories lie along at least one route, or are at least in part congruent with routes of topological maps. Preferably, a multiplicity of trajectories that have already been traveled may be received as a result of crowdsourcing. In particular, the trajectories of automated or partially automated vehicles may be ascertained and provided.

The corresponding measurement data or trajectory data include position data and distance data from vehicles that are ahead. Moreover, the measurement data may contain further data and information.

According to an example embodiment of the present invention, at least one topological map of traffic infrastructure is preferably already present in digital form. The collected trajectories having the measurement data are recorded and combined with the corresponding routes for enrichment of the map, such that the measurement data are arranged along the routes of the topological map and provided with corresponding coordinates or position data.

In a further step, a group of test points along the at least one route is distributed at pre-defined distances from one another. In this context, the distance between the test points may be configured to be constant or variable in order to take different traffic situations into account at the appropriate resolution.

At each test point, an intersection line that is oriented transversely in relation to a course of the route is generated. In this context, pairs of points corresponding to the intersection lines are ascertained from the multiplicity of measurement data. In a further step, based on the distance data, at least one following distance is allocated to the pairs of points corresponding to at least one intersection line. Thus, a multiplicity of intersection lines or test points may be present at defined distances from one another along the route and may include following distances.

Using the method, a topological map of traffic infrastructure may be enriched with information on following distances from a multiplicity of trajectories. A following distance indicates the distance of an ego road user, such as a vehicle, from the road user ahead. It may be detected by onboard sensors such as a camera, LIDAR sensor or radar sensor and recorded together with position data of a trajectory. This crowdsourced distance information provides an empirical reflection of a comfortable distance between road users on a route in a particular traffic scenario. For example, the following distance between vehicles on a freeway is typically greater than that between road users in urban traffic. Thus, this information on following distances may be provided in order to proactively observe a certain distance from the vehicle ahead in corresponding traffic scenarios, and to enhance comfort by avoiding sharp braking.

According to an example embodiment of the present invention, a group of trajectories that has been collected from a multiplicity of road users on a route can be used to extract the following distance along the route and to create a following distance profile along the route.

Creating the test points and the intersection lines enables the measurement points that are ascertained at any desired positions to be standardized to a pre-defined coordinate system or associated with the pre-defined test points. The newly associated data can thus be optimized in relation to a digital map, and incorporation of the following distances into the digital map can be simplified.

According to a further aspect of the present invention, a control device is provided, the control device being configured to carry out the method. The control device may for example be a control device on the vehicle, a control device external to the vehicle, or a server unit external to the vehicle such as a cloud system.

Moreover, according to one aspect of the present invention, a computer program is provided, which comprises commands which, when the computer program is executed by a computer or a control device, cause this to carry out the method according to the present invention. According to a further aspect of the present invention, a machine-readable storage medium is provided, on which the computer program according to the present invention is stored.

In one exemplary embodiment of the present invention, the pairs of points that correspond to an intersection line are ascertained as measurement points of the trajectory that lie on both sides of and adjoining the intersection line. As a result, two measurement points of a trajectory of an intersection line may be associated with or allocated to the corresponding test point if the intersection line lies between the two measurement points. As a result of this measure, only the measurement points that are arranged next to the intersection line are allocated to it. Measurement points that are arranged further away from the intersection line are not allocated, or are allocated to a subsequent intersection line.

According to a further embodiment of the present invention, the pairs of points corresponding to at least one intersection line are ascertained if a connecting line between two measurement points or a regression of the trajectory data intersects the corresponding intersection line. Thus, the measurement points are allocated to an intersection line if the trajectory intersects the intersection line.

According to a further exemplary embodiment of the present invention, a multiplicity of following distances based on a multiplicity of trajectories is allocated to at least one intersection line. In this case, for each trajectory one following distance may be respectively associated with an intersection line provided the trajectory goes beyond the intersection line. Based on a multiplicity of ascertained trajectories that have been recorded along the route, a plurality of following distances may be associated with the intersection line or the test point. As the number of following distances increases, the accuracy of the allocated following distances improves, for example by taking the mean of the following distances.

According to a further embodiment of the present invention, for each intersection line there is calculated, based on the multiplicity of following distances, a standard deviation, a mean value, a variance, a measure of dispersion, a 25% percentile and/or a 75% percentile. As a result, the following distances that are ascertained from crowdsourcing and associated with the intersection lines are limited to a mean value and given a defined dispersion around the mean value. This allows the following distances to be used in a technically simple manner in the context of a warning system on the vehicle.

In particular, a distance from a road user ahead may be measured in the vehicle. If the measured distance is below the mean following distance plus the dispersion or standard deviation, a first warning can be output. If the following distance falls below the mean value at the corresponding position of the vehicle, measures—such as automatic throttling of the speed—may be taken by the vehicle or initiated by the control device.

According to a further exemplary embodiment of the present invention, based on the following distances that are allocated to the intersection lines along at least one route, a following distance profile is created. In this context, the following distance profile may include a multiplicity of test points with allocated following distances. Depending on the configuration, the following distances may be replicated along the route by connecting lines or by functions in order to enable a following distance to be provided at each position along the route.

According to a further embodiment of the present invention, a vehicle position of at least one vehicle and a distance from a road user ahead are received or ascertained. Depending on the vehicle position, the distance is compared with at least one value of a following distance from the following distance profile. If this value is below a limit value of the following distance, a warning is generated, or at least one measure is triggered for adapting the distance from the road user ahead. This enables a technically simple, efficient use of the following distance profile by road users, in particular vehicles. In particular, the following distance can be monitored by a vehicle sensor system and the driver can be alerted if the safety distance from the vehicle ahead is too small.

According to a further exemplary embodiment of the present invention, the limit value of the following distance is established as a mean value plus a standard deviation. In this way, the limit value for warning messages may be ascertained in a technically simple manner and updated where necessary.

Preferred exemplary embodiments of the present invention will be explained below in more detail with reference to highly simplified schematic illustrations.

DETAILED DESCRIPTION OF EXAMPLE EMBODIMENTS

Figure 1:
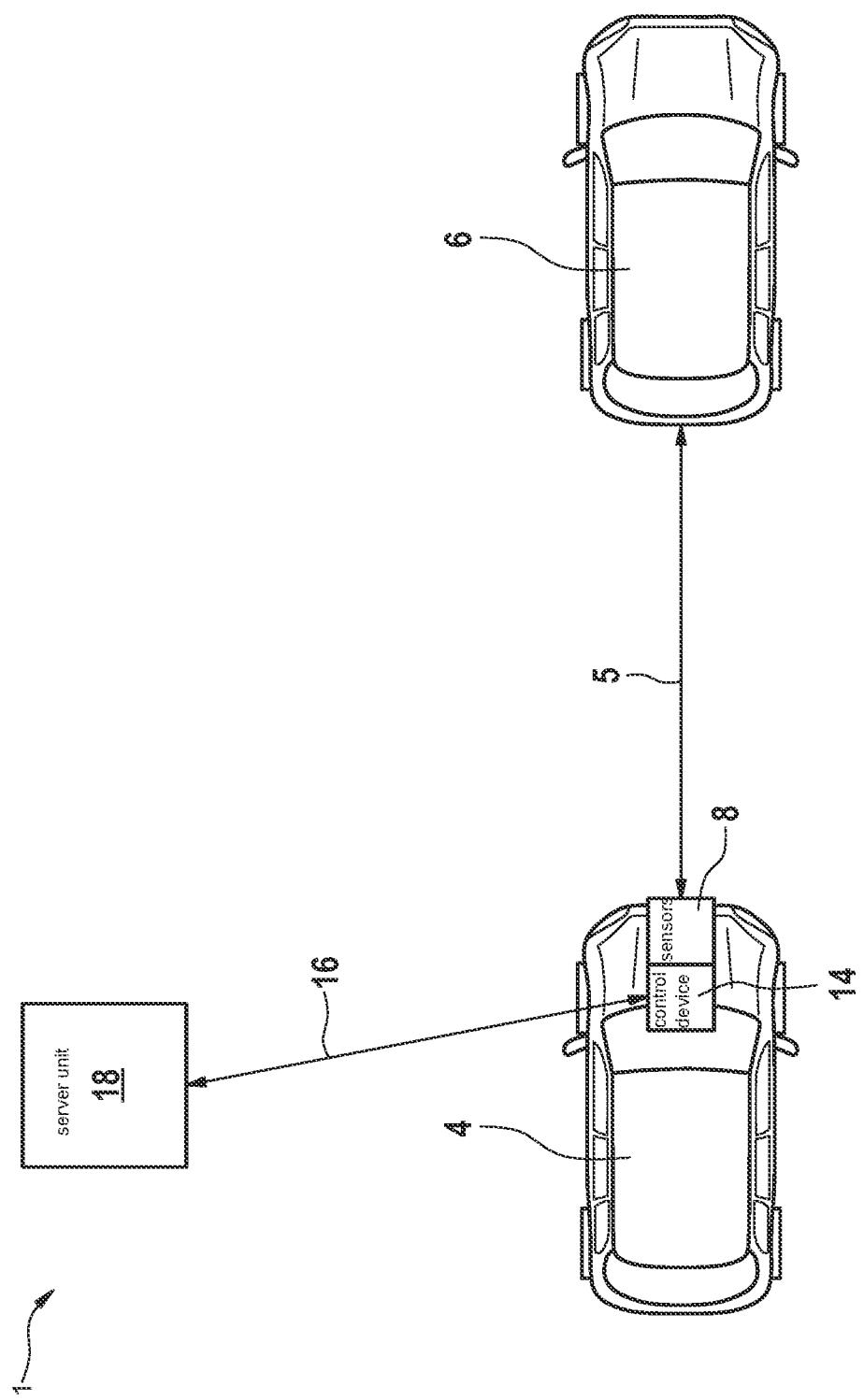
FIG. 1 shows a schematic illustration of a vehicle arrangement according to an example embodiment of the present invention.

FIG. 1 shows a schematic illustration of a vehicle arrangement 1 according to an embodiment. In this case, the vehicle arrangement 1 serves to illustrate a method 2 that is described in more detail in FIG. 2, according to an embodiment according to the present invention.

By way of example, the vehicle arrangement 1 includes an ego vehicle 4 driving behind a further road user 6. Between the ego vehicle 4 and the road user 6 ahead there is a distance 5, or following distance F. The following distance F from the road user 6 ahead may be measured by onboard sensors 8 on the ego vehicle 4.

As sensors 8 on the vehicle there may be used for example LIDAR sensors, radar sensors, camera sensors, ultrasound sensors and similar. In this context, the ego vehicle 4 may be, in accordance with the German Federal Highway Research Institute standard, assisted, partially automated, highly automated and/or fully automated or in driverless operation.

Figure 3:
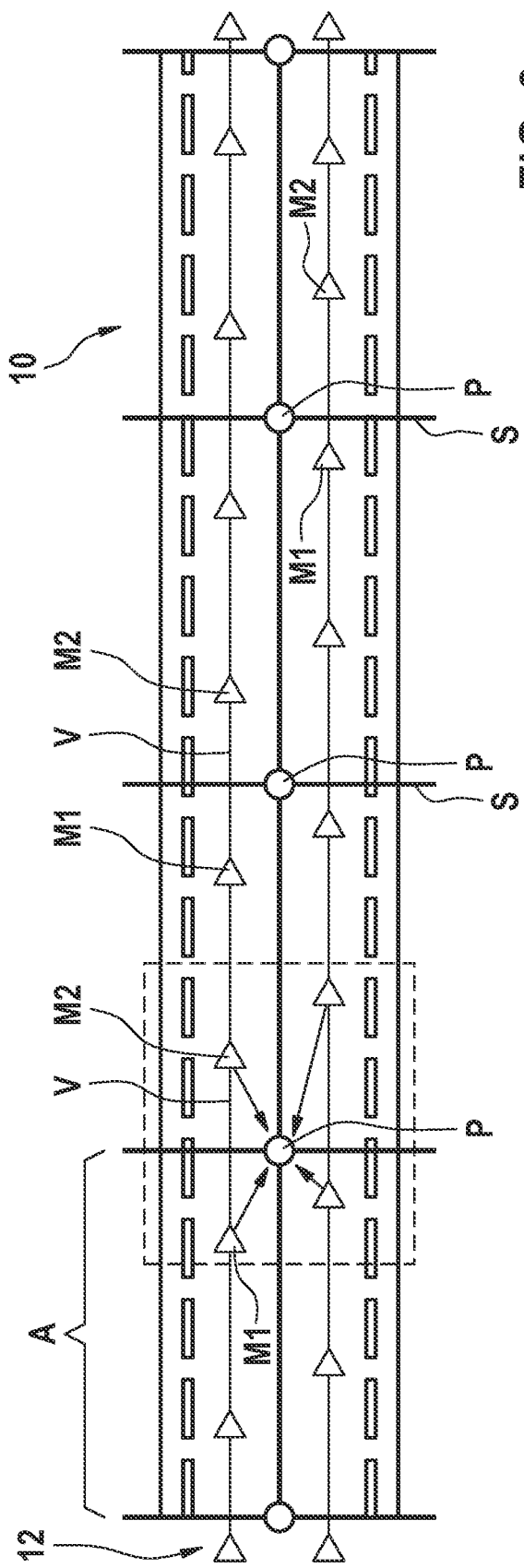
FIG. 3 shows a plan view of a section of a route with exemplary trajectories and created intersection lines, according to an example embodiment of the present invention.

The vehicle arrangement 1 shows a section of a route 10, which takes the form of a road, illustrated in FIG. 3, with two lanes in the same direction of travel.

The trajectory 12, likewise shown in FIG. 3, of the ego vehicle 4 is recorded by a control device 14 on the vehicle. This may be done with the aid of GNSS sensors (not illustrated). Moreover, the control device 14 can receive and process ascertained measurement data from the sensors 8 on the vehicle.

For external processing of the measurement data and for crowdsourced collection of measurement data, the control device 14 on the vehicle can make a wireless communication connection 16, for example in the form of a mobile radio connection or WLAN connection, with a server unit 18 external to the vehicle, and can transmit the measurement data with position data on the ego vehicle 4, in processed or unprocessed form, to the server unit 18 external to the vehicle.

The server unit 18 external to the vehicle can process the received measurement data and information and utilize it for example to adapt digital maps.

The ego vehicle 4 and the road user 6 serve only for illustration. In particular, the vehicle arrangement 1 may include a multiplicity of vehicles 4 or road users 6 that can transmit the measurement data to the server unit 18 external to the vehicle in parallel or at different times.

Figure 2:
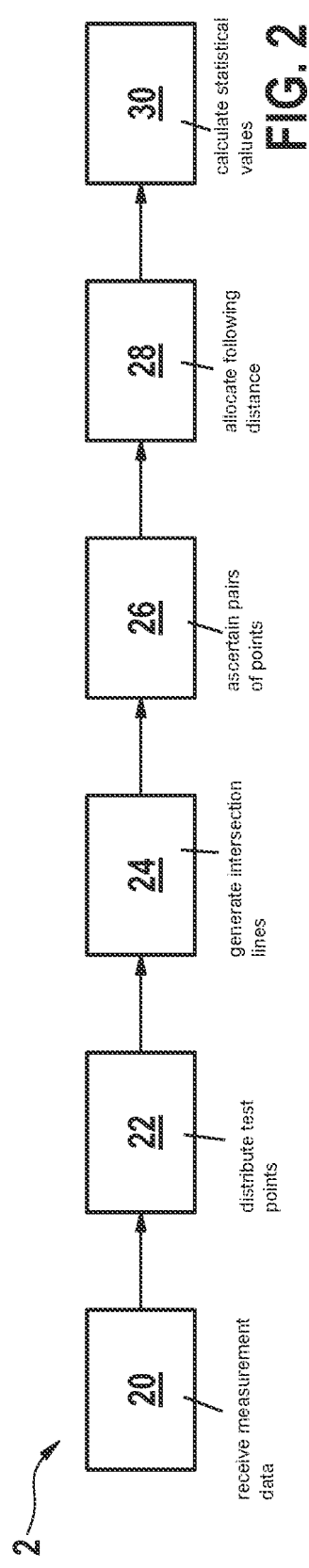
FIG. 2 shows a schematic flow chart for the purpose of illustrating a method according to an example embodiment of the present invention.

FIG. 2 illustrates a schematic flow chart for the purpose of illustrating a method 2 according to an embodiment. The method 2 serves for the position-dependent ascertaining of following distances F, in particular by a control device, which may take the form of a control device 14 on the vehicle or a server unit 18 external to the vehicle.

In a step 20, measurement data of at least one trajectory 12 having a multiplicity of measurement points M are received. The measurement points M include position data and data of the distance from road users 6 ahead, along at least one route 10. Depending on the ascertained positions of the vehicle 4, the measurement data are matched to a digital, topological map of the traffic infrastructure. In this context, the measurement data, with their locations adapted, may overlap the digital map or may be presented in the form of a level of the digital map. This is shown schematically in FIG. 3.

A further step 22 of the method 2 includes distributing a group of test points P along the route 10 at pre-defined intervals A. In particular, a series of sample points or test points P along the route 10 may be generated at a certain spatial interval A. The interval is determined by a predetermined distance parameter.

Depending on the configuration, the distance parameter may be constant along the route 10 or may vary.

In a further step 24, there is generated at each test point P an intersection line S that is oriented transversely in relation to a course of the route 10. As a result, different lanes of the route 10, and also trajectories 12 deviating from the route 10, may pass through the intersection lines S and be allocated to the corresponding test points P through which the intersection lines S pass. Then, in a further step 26, pairs M1, M2 of points corresponding to the intersection lines S are ascertained from the multiplicity of intersection points M.

For each intersection line S, the method 2 associates the measurement points M of the trajectory 12 having connecting lines V that connect the measurement points M1, M2 on both sides of the intersection lines S, with the corresponding intersection line S that intersects the connecting line V. These measurement points M1, M2 are designated the trajectory intersection points of the corresponding test point. FIG. 3 illustrates schematically this association of the measurement points M1, M2 with intersection lines S.

Based on the distance data, at least one following distance F is allocated to the pairs M1, M2 of points corresponding to the at least one intersection line.

In a further step 28, at each test point P, the following distance F of each trajectory 12, which intersects with the corresponding intersection line S, of the pair M1, M2 of points that contributes to such an intersection point S, can be allocated. This may be implemented for example by linear interpolation of the following distances F of the two pairs M1, M2 of points.

In step 30, a series of statistical values relating to the following distance F, such as mean value, variance, median, minimum and maximum values of the following distance, and span of the following distance values, can be calculated using the following distance values F of all the trajectories 12 that intersect with the intersection line S.

Figure 4:
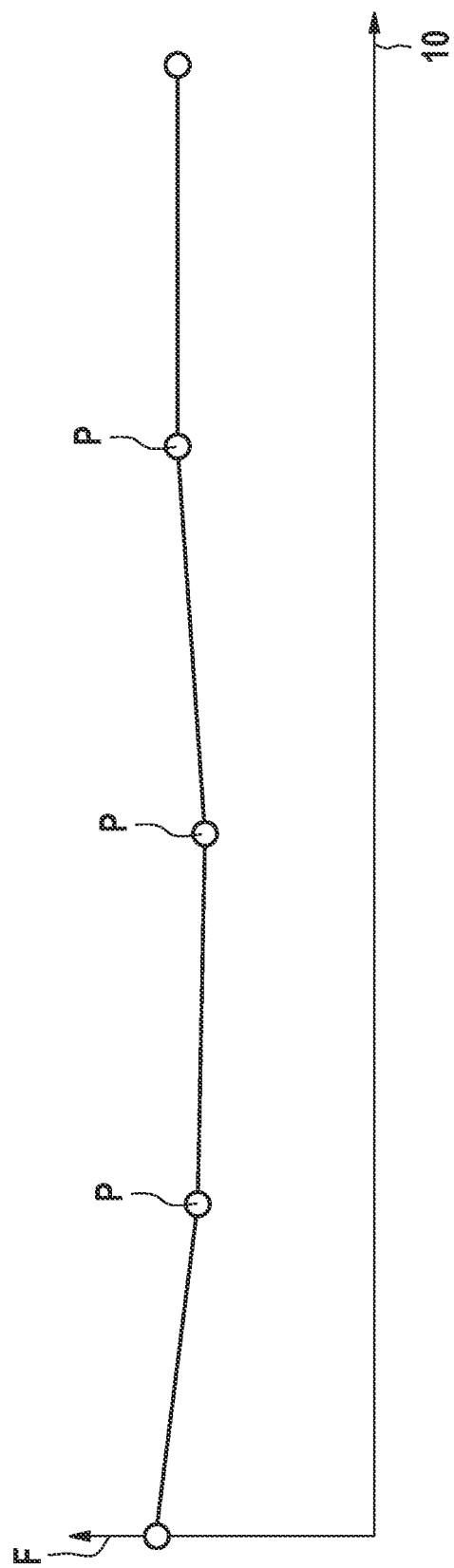
FIG. 4 shows an exemplary following distance profile for the section of the route shown in FIG. 3, according to an example embodiment of the present invention.

Based on the scenario illustrated in FIG. 3, FIG. 4 shows a following distance profile having the mean values of the following distance F at each test point P along the route 10. The respective mean values of the following distance F are connected to one another by linear interpolation, with the result that not only discrete values of the following distance F at the test points P but also estimated values of the following distance F between the test points P can be provided.

The result reflects the change in following distance F along the route 10 at a predetermined spatial resolution. Thus, a technically simple enrichment of routes 10 by following distance profiles can be made possible using crowdsourced trajectories.

What is claimed is:

1. A method for autonomous control of an ego vehicle, the method comprising the following steps:

for each of at least one route of a plurality of routes, while the ego vehicle is traveling along a respective one of a plurality of trajectories that correspond to the respective route:

generating by the ego vehicle measurement data of the respective trajectory, the measurement data including, for each of a plurality of measurement points along the respective trajectory, a respective position data identifying a respective position of the ego vehicle and a respective distance data that indicates a distance of the ego vehicle from vehicles that are ahead while the ego vehicle was at the respective position identified by the measurement data of the respective measurement point; and transmitting, by a processor of the ego vehicle, the measurement data of the respective trajectory to a central processor that is programmed to:

distribute a group of test points along the respective route at pre-defined distances from one another;

generate, at each of the test points, a respective intersection line that is oriented transversely in relation to a course of the route;

for each of a plurality of the intersection lines:

ascertain a respective pair of the plurality of measurement points that corresponds to the respective intersection line;

based on the distance data of the ascertained respective pair of measuring points, allocate a respective following distance to the respective pair of points; and ascertain a following distance value for the respective one of the test points for which the respective intersection line was generated using the respective following distance allocated to the ascertained respective pair of measuring points, thereby updating a following distance profile of distance values along the at least one route;

receiving, by the processor of the ego vehicle and from the central processor, the updated following distance profile; and performing, by the processor of the ego vehicle, an automatic distance control of the ego vehicle to adjust distances maintained by the ego vehicle while driving along the at least one route.

2. The method as recited in claim 1, wherein, for the each of the plurality of intersection lines, the respective pair of the plurality of measurement points ascertained for the respective intersection line are associated with respective positions of the ego vehicle closest to the respective intersection line at respective ones of two sides of the respective intersection line along a direction perpendicular to the respective intersection line.

3. The method as recited in claim 1, wherein, for the each of the plurality of intersection lines, the pair of points corresponding to the respective intersection line are ascertained when a connecting line between two of the measurement points or a regression of the measurement data of the respective trajectory intersects the corresponding intersection line.

4. The method as recited in claim 1, wherein a multiplicity of following distances based on a multiplicity of trajectories is allocated to at least one of the intersection lines, the central processor being programmed to update the following distance profile based on a combination of the multiplicity of following distances.

5. The method as recited in claim 4, wherein the update of the following distance profile is based on a calculation, for each of the intersection lines, for the multiplicity of following distances, of: a standard deviation, and/or a mean value, and/or a variance, and/or a measure of dispersion, and/or a 25% percentile and/or a 75% percentile.

6. The method as recited in claim 1, further comprising:
monitoring, by the processor of the ego vehicle, a distance of the ego vehicle from a road user ahead;
comparing values of the monitored distance to corresponding ones of the distance values from the following distance profile; and
responsive to a result of the comparison being that one or more of the compared monitored distances being below a limit value of a corresponding one or more of the distance values from the following distance profile, outputting, by the processor of the ego vehicle, a warning.

7. The method as recited in claim 6, wherein the limit value is established as a mean value plus a standard deviation.

8. A system of an ego vehicle for autonomous control of the ego vehicle, the system comprising:
sensors; and
a processor, the processor being programmed to:
for each of at least one route of a plurality of routes, while the ego vehicle is traveling along a respective one of a plurality of trajectories that correspond to the respective route:
generate, using the sensors, measurement data of the respective trajectory, the measurement data including, for each of a plurality of measurement points along the respective trajectory, a respective position data identifying a respective position of the ego vehicle and a respective distance data that indicates a distance of the ego vehicle from vehicles that are ahead while the ego vehicle was at the respective position identified by the measurement data of the respective measurement point; and
transmit the measurement data of the respective trajectory to a central processor that is programmed to:
distribute a group of test points along the respective route at pre-defined distances from one another;
generate, at each of the test points, a respective intersection line that is oriented transversely in relation to a course of the route;
for each of a plurality of the intersection lines:
ascertain a respective pair of plurality of measurement points that corresponds to the respective intersection line;
based on the distance data of the ascertained respective pair of measuring points, allocate a respective following distance to the respective pair of points; and
ascertain a following distance value for the respective one of the test points for which the respective intersection line was generated using the respective following distance allocated to the ascertained respective pair of measuring points, thereby updating a following distance profile of distance values along the at least one route;
receive the updated following distance profile from the central processor; and
perform an automatic distance control of the ego vehicle to adjust distances maintained by the ego vehicle while driving along the at least one route.

9. A non-transitory machine-readable storage medium on which is stored a computer program that is executable by a computer of an ego vehicle and that, when executed by the computer, causes the computer to perform a method for autonomous control of the ego vehicle, the method including the following steps:
for each of at least one route of a plurality of routes, while the ego vehicle is traveling along a respective one of a plurality of trajectories that correspond to the respective route:
generating, using sensors of the ego vehicle, measurement data of the respective trajectory, the measurement data including, for each of a plurality of measurement points along the respective trajectory, a respective position data identifying a respective position of the ego vehicle and a respective distance data that indicates a distance of the ego vehicle from vehicles that are ahead while the ego vehicle was at the respective position identified by the measurement data of the respective measurement point; and
transmitting the measurement data of the respective trajectory to a central processor that is programmed to:
distribute a group of test points along the respective route at pre-defined distances from one another;
generate, at each of the test points, a respective intersection line that is oriented transversely in relation to a course of the route;
for each of a plurality of the intersection lines:
ascertain a respective pair of the plurality of measurement points that corresponds to the respective intersection line;
based on the distance data of the ascertained respective pair of measuring points, allocate a respective following distance to the respective pair of points; and ascertain a following distance value for the respective one of the test points for which the respective intersection line was generated using the respective following distance allocated to the ascertained respective pair of measuring points, thereby updating a following distance profile of distance values along the at least one route;
receiving the updated following distance profile from the central processor; and
performing an automatic distance control of the ego vehicle to adjust distances maintained by the ego vehicle while driving along the at least one route.

\* \* \* \* \*